No. 871,294. PATENTED NOV. 19, 1907.
T. W. POTTS.
VEHICLE FOR RECREATION OR AMUSEMENT.
APPLICATION FILED JUNE 17, 1907.
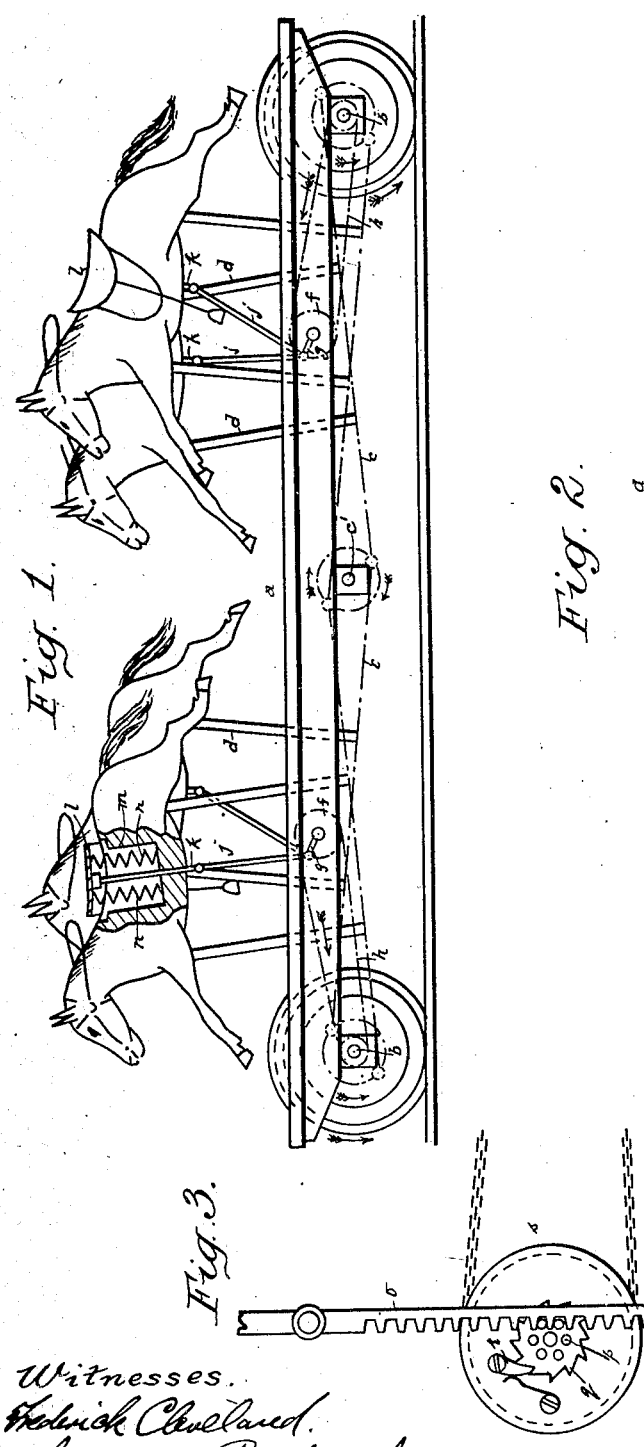
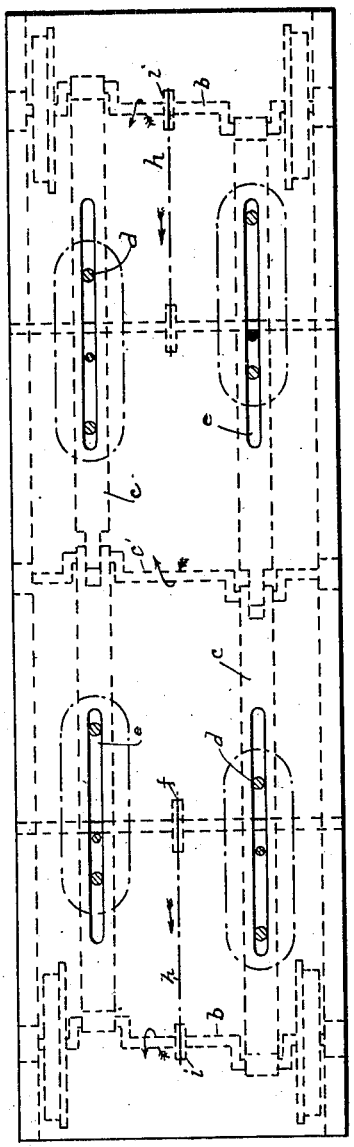

UNITED STATES PATENT OFFICE.

THOMAS WILLIAM POTTS, OF FULHAM, LONDON, ENGLAND.

VEHICLE FOR RECREATION OR AMUSEMENT.

No. 871,294.  Specification of Letters Patent.  Patented Nov. 19, 1907.

Application filed June 17, 1907. Serial No. 379,442.

*To all whom it may concern:*

Be it known that THOMAS WILLIAM POTTS, a subject of the Kingdom of Great Britain and Ireland, residing at 30 Chesilton road, Fulham, in the county of London, England, has invented certain new and useful Improvements in Vehicles for Recreation or Amusement; and he does hereby declare the following to be a full, clear, and exact description of the invention, such as will enable others skilled in the art to which it appertains to make and use the same.

This invention for improvements in vehicles for recreation or amusement relates to vehicles for use on switchback or other recreation railways or tracks, wherein seats, horses, or the like are connected to the traveling wheels by means of coupled crank axles in such a manner that a rising and falling motion is imparted to the seat, horse, or the like, which is mounted on the crank axles as the vehicle is propelled; and consists in operatively connecting the seat with the traveling wheels in such manner that the movement of the vehicle may be accelerated by the exertions of the riders.

In the accompanying sheet of illustrative drawings Figure 1 is a side elevation of a recreation vehicle constructed according to this invention, Fig. 2 is a sectional plan of the same, and Fig. 3 is a detail side elevation showing a slightly modified form of propelling gear.

In one way of carrying out this invention, a suitable frame $a$ is mounted on four wheels connected in pairs by crank axles $b$ adapted to rotate with the wheels, and supporting a movable connecting rod or support $c$ on which the horse or the like is fixed by means of suitable supporting rods or bars $d$ adapted to move in slots $e$ in a foot board or the like fixed on the underframing. There is preferably a support $c$ for each crank and the inner ends of the supports from the two crank shafts $b$ are connected with a crank shaft $c'$ journaled at the center of the frame.

A chain wheel $f$ and cranks $g$ are mounted in the framing in a suitable position under each horse and is connected by a chain $h$, belt or the like with a free wheel or like device $i$ carried on one of the crank axles, and is operated by means of a connecting rod $j$ and plunger $k$ attached to a movable saddle $l$.

The plunger passes up into the body of the horse and through an enlarged space or recess $m$ formed therein for the reception of springs $n$ which serve to raise the saddle and return the chain wheel $f$ and cranks $g$ to an operative position after each depression.

The stirrups are attached to the body of the horse so that the rider can by standing lift his weight from the saddle as is usual in horse riding to assist in the propulsion of the vehicle at will.

In the arrangement of gear shown in Fig. 3 instead of the connecting rod $j$ a rack $o$ is employed which engages with the gear wheel $p$. Attached to one side of the wheel $p$ is a ratchet wheel $q$ which by means of a suitable pawl $r$ operates the chain wheel $s$ when the rack is depressed but allows it to return to its normal position under the tension of the saddle springs on its return stroke. The gravity tracks to which these vehicles are applied may preferably be arranged in duplicate and two or more horses may be mounted on each vehicle, when it will be easily seen that the speed of the respective vehicles may be increased by either of the riders.

What I claim and desire to secure by Letters Patent is;—

1. In a vehicle of the class described, a wheeled frame provided with a crank axle, a support connected with said crank, a horse mounted on the support provided with a movable seat, and driving mechanism for propelling the vehicle when the horse and saddle are actuated.

2. In a vehicle of the class described, a wheeled frame provided with a crank axle, a support connected with said crank, a horse on the support provided with a recess, springs in said recess, a seat on said springs, and driving mechanism connected with the saddle and with said axle for propelling the vehicle when the horse and saddle are actuated.

3. In a vehicle of the class described, a wheeled frame provided with a crank axle, a chain wheel on the axle and a support connected with the crank, a horse on the support provided with stirrups and a plunger, a shaft in the frame under the horse provided with a crank and a chain wheel, a chain on said chain wheels, and a connecting rod from said crank to the plunger.

4. In a vehicle of the class described, a wheeled frame provided with a crank at its ends for said wheels and a crank at the middle, supports connected at their ends with said cranks, a slotted foot board in the frame, pairs of rods from each support through said slots, a horse on each pair of supports, a vertically movable saddle on each horse, and means for propelling the vehicle forward when the horse and saddle are actuated.

In testimony whereof he has affixed his signature, in presence of two witnesses.

THOMAS WILLIAM POTTS.

Witnesses:
SHURMER SIBSHORP,
DAISY LILIAN SYMMONS.